(12) United States Patent
Dore et al.

(10) Patent No.: US 8,009,640 B2
(45) Date of Patent: Aug. 30, 2011

(54) METHOD OF CREATION OF A NEW COMMUNICATION NETWORK BY A WIRELESS TERMINAL AND TERMINAL IMPLEMENTING THE METHOD

(75) Inventors: Renaud Dore, Rennes (FR); Ludovic Jeanne, Rennes (FR); Patrick Lopez, Livre sur Changeon (FR); Christophe Vincent, Chevaigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 856 days.

(21) Appl. No.: 10/519,115

(22) PCT Filed: Jun. 18, 2003

(86) PCT No.: PCT/EP03/06621
§ 371 (c)(1),
(2), (4) Date: Dec. 23, 2004

(87) PCT Pub. No.: WO2004/004223
PCT Pub. Date: Jan. 8, 2004

(65) Prior Publication Data
US 2005/0190730 A1    Sep. 1, 2005

(30) Foreign Application Priority Data
Jun. 28, 2002  (FR) ..................................... 02 08097

(51) Int. Cl.
*H04W 4/00* (2009.01)
(52) U.S. Cl. ....................................... 370/338; 370/328

(58) Field of Classification Search .................. 455/507, 455/435.1, 432.1, 510, 41.2, 41.3, 448, 435.2, 455/452.2, 426.1, 436–447; 370/338, 332, 370/330, 331, 349, 401, 328, 322, 329
See application file for complete search history.

(56) References Cited

U.S. PATENT DOCUMENTS
5,828,663 A     10/1998  Ikegami
6,891,820 B1 *  5/2005   Pham et al. .................... 370/338
(Continued)

FOREIGN PATENT DOCUMENTS
EP     1187397      3/2002
EP     1206070      5/2002

OTHER PUBLICATIONS

J. Habetha et al.: "Central controller handover procedure for ETSI-BRAN HiperLAN/2 Ad Hoc networks and clustering with quality of service guarantees", Annual Workshop on Mobile Ad Hoc Networking & Computing, Aug. 11, 2000, pp. 131-132.

(Continued)

*Primary Examiner* — Brandon J Miller
(74) *Attorney, Agent, or Firm* — Robert D. Shedd; Joseph J. Opalach; Jerome G. Schaefer

(57) ABSTRACT

The invention relates to a method of creation of a new communication network by a wireless terminal. The wireless terminal is initially part of an existing centralized network that includes an access point able to control the association of wireless terminals to its network. In the event of disassociation of the terminal from the network, the method makes provision to initiate a procedure for creating a new network including a declaration of the terminal as access point of the new network, where the operating parameters of the new network are such that communications on the new network do not interfere with the existing network.

4 Claims, 3 Drawing Sheets

U.S. PATENT DOCUMENTS

| | | | |
|---|---|---|---|
| 6,922,405 B2 * | 7/2005 | Eikelenboom et al. | 370/338 |
| 7,061,895 B1 | 6/2006 | Habetha | |
| 7,082,535 B1 * | 7/2006 | Norman et al. | 713/163 |
| 7,136,644 B2 * | 11/2006 | Hull | 455/432.1 |
| 7,146,433 B2 * | 12/2006 | Cromer et al. | 709/239 |
| 7,184,767 B2 * | 2/2007 | Gandolfo | 455/435.2 |
| 7,248,570 B2 * | 7/2007 | Bahl et al. | 370/329 |
| 7,289,463 B2 * | 10/2007 | Ozugur | 370/328 |
| 2002/0039357 A1 * | 4/2002 | Lipasti et al. | 370/338 |
| 2002/0119683 A1 * | 8/2002 | Paredes et al. | 439/76.1 |
| 2003/0123420 A1 * | 7/2003 | Sherlock | 370/338 |
| 2005/0003856 A1 * | 1/2005 | Jang et al. | 455/553.1 |
| 2005/0071476 A1 * | 3/2005 | Tejaswini et al. | 709/227 |

OTHER PUBLICATIONS

"Broadband Radio Access Networks (BRAN): HIPERLAN Type 2: System Overview", ETSI TR 101 683 V1.1.1., Feb. 2000, pp. 1-19.

Search Report Dated Sep. 4, 2003.

* cited by examiner

METHOD OF CREATION OF A NEW COMMUNICATION NETWORK BY A WIRELESS TERMINAL AND TERMINAL IMPLEMENTING THE METHOD

This application claims the benefit, under 35 U.S.C. §365 of International Application PCT/E03/06621, filed Jun. 18, 2003, which was published in accordance with PCT Article 21(2) on Jan. 8, 2004 in English and which claims the benefit of French patent application No. 0208097, filed Jun. 28, 2002.

FIELD OF THE INVENTION

The invention relates to a method of creation of a new network by a terminal, more specifically when the terminal was initially associated to an existing network. The invention also relates to the terminal itself. It is particularly applicable in the context of wireless networks with centralized control, although not limited to this context.

BACKGROUND OF THE INVENTION

A HIPERLAN 2 type centralized wireless communication network has limited resources. When a large number of terminals are associated to the network, some terminals may be incapable of reserving the resources required for their applications.

The document "ETSI TS 101 761-4 V1.4.1A (2002-5) BRAN HIPERLAN Type 2, Data Link Control (DLC) Layer; Part 4: Extension for Home Environment, section 6.7.1 'Dynamic Central Controller Selection/Principle'" discloses that a wireless terminal that is capable of becoming central controller, and for which an attempt to associate to a central controller of an existing network fails, itself attempts to become central controller by initiating the central controller selection process described in the aforementioned document.

SUMMARY OF THE INVENTION

The invention relates to a method of creation of a new communication network by a wireless terminal, which method is characterized in that, the wireless terminal initially being part of an existing centralized network that includes an access point able to control the association of wireless terminals to its network, it includes, for the associated terminal, the steps of:
  disassociation of the terminal from the network; and
  initiation of a procedure for creating a new network including a declaration of the terminal as access point of the new network, where the operating parameters of the new network are such that communications on the new network do not interfere with the existing network.

Thus, a terminal previously associated to a network, but disassociated from this network, can create a new network, not interfering with the initial network. New resources are then available.

According to a preferred embodiment, the terminal takes the initiative for the disassociation. The terminal can decide on this disassociation if for example the access point of the initial network does not respond favourably to certain requests, for example regarding the allocation of resources of the existing network.

BRIEF DESCRIPTION OF THE DRAWINGS

Other features and advantages of the invention will become apparent through the description of a nonlimiting example embodiment, explained with reference to the accompanying figures, in which.

DESCRIPTION OF PREFERRED EMBODIMENT

The example embodiment fits into the context of a HIPERLAN 2 communication network. HIPERLAN 2 is a standard under development by ETSI (European Telecommunications Standards Institute). In this type of network in which communication takes place by radio waves of about 5 GHz, a unit called Access Point (AP) or Central Controller (CC) manages the access of other network devices to the transmission medium. These other devices are called wireless terminals or Mobile Terminals (MTs). To be able to access the network, a wireless terminal must first associate to the access point. The relevant procedure is described in particular in the following document:

"ETSI TS 101 761-2 V.1.4.1A (2002-05) Broadband Radio Access Networks (BRAN); HIPERLAN Type 2: Data Link Control (DLC) Layer; Part 2: Radio Link Control (RLC) Sublayer", and in particular section 5.1 "Services supporting ACF (Association Control Function)".

According to the present example embodiment, there can be various reasons for a non-association of a wireless terminal to the access point, or a disassociation of an associated wireless terminal.

Figure 1:
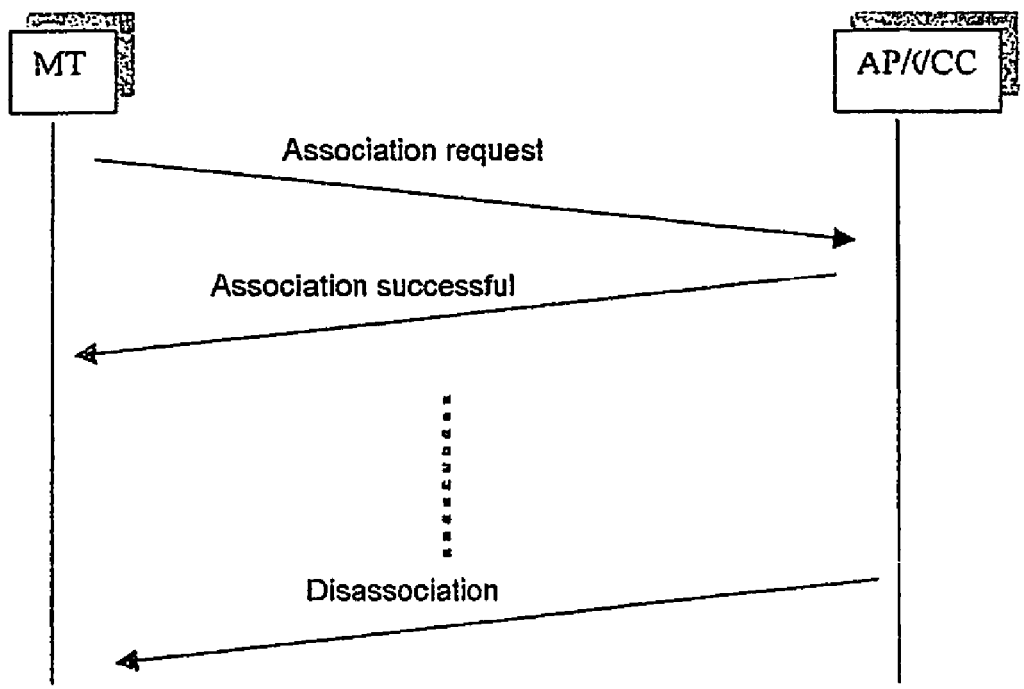
FIG. 1 is a diagram showing information exchanges between the terminal and the access point in the case of a disassociation after association.

FIG. 1 is a diagram of a network having an access point AP/CC and a wireless terminal MT. Other wireless terminals of the network are not illustrated. A wireless terminal typically has an interface with the communication medium (the wireless network) and a microprocessor running applications and appropriate protocols, the code for this being stored in a memory inside the terminal. The diagram of FIG. 1 indicates the information exchanged between the two devices during an attempt of association of the wireless terminal MT to the access point AP/CC. The wireless terminal, once activated, analyses the radio activity to detect the presence of a network having characteristics that enable—a priori—an association. These characteristics include in particular the network identity and are broadcast in the data frame controlled by the access point.

The terminal starts a dialogue with the access point to exchange parameters such as the list of supported convergence layers and whether a wireless terminal can transmit in direct mode to another wireless terminal. In FIG. 1, it is assumed that the association takes place. Later, with the mobile terminal now associated, the access point may decide arbitrarily to disassociate this terminal.

Figure 2:
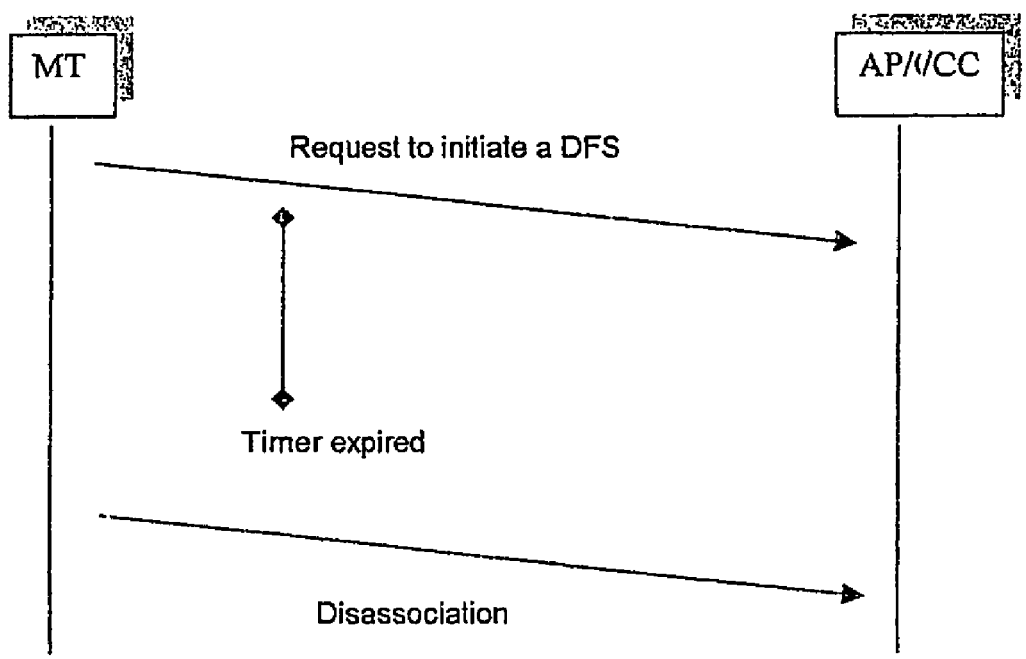
FIG. 2 is a diagram of the same type as FIG. 1 in the case of a rejection of initiation of a change of frequency by the access point.

Furthermore, a wireless terminal associated to an access point may be disturbed by a device of another network using the same frequency. In this case, the wireless terminal can request the access point to which it is associated to perform a change of frequency of the network. This process is referred to as DFS (Dynamic Frequency Selection). The access point can however refuse to change frequency, and the wireless terminal can then disassociate itself. The wireless terminal can also disassociate itself if the access point did not reply to the DFS request in a predetermined time. This scenario is illustrated in FIG. 2.

Figure 3:
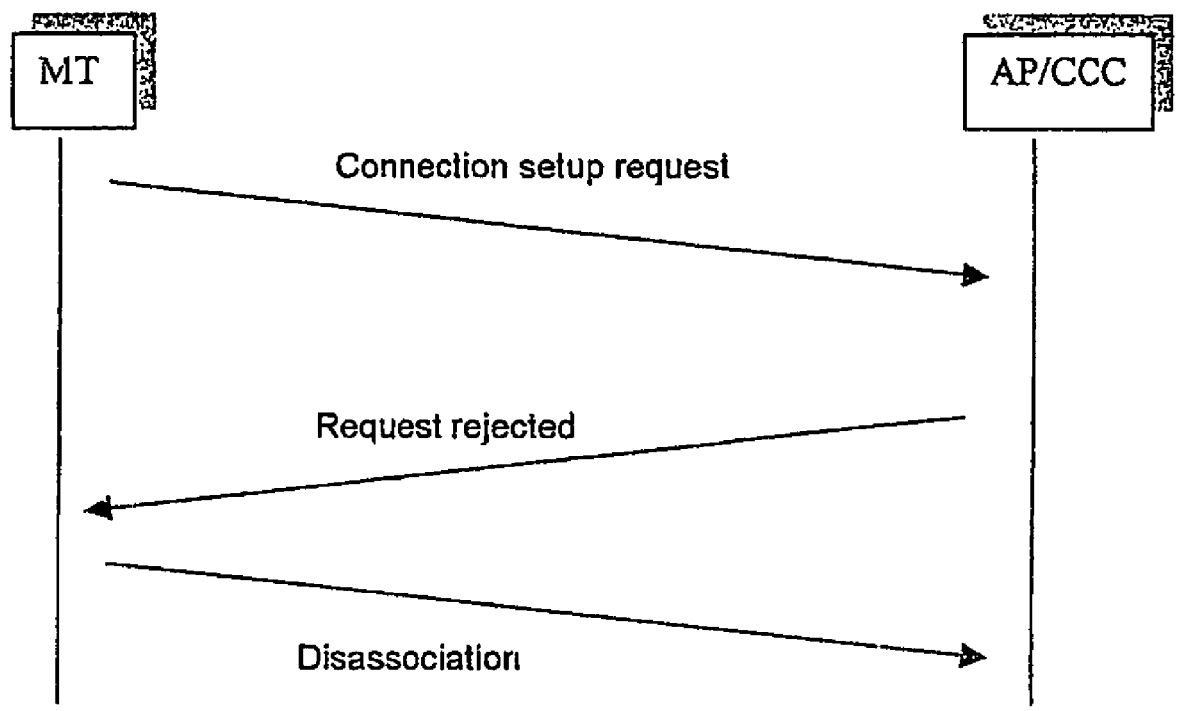
FIG. 3 is a diagram of the same type as FIG. 1 in the case of a connection setup rejection.

FIG. 3 represents the network in the state in which the wireless terminal is associated to the access point. The wireless terminal issues a connection setup request to the access point. The latter can reject the request, notifying the wireless terminal of the rejection. This can happen if the traffic level on the network is significant. According to the present example embodiment, an application of the mobile terminal then decides to disassociate itself from the network, at least for some types of connection. According to the present embodiment, this disassociation is initiated only if no other connection in the network involves the mobile terminal in question.

Figure 4:
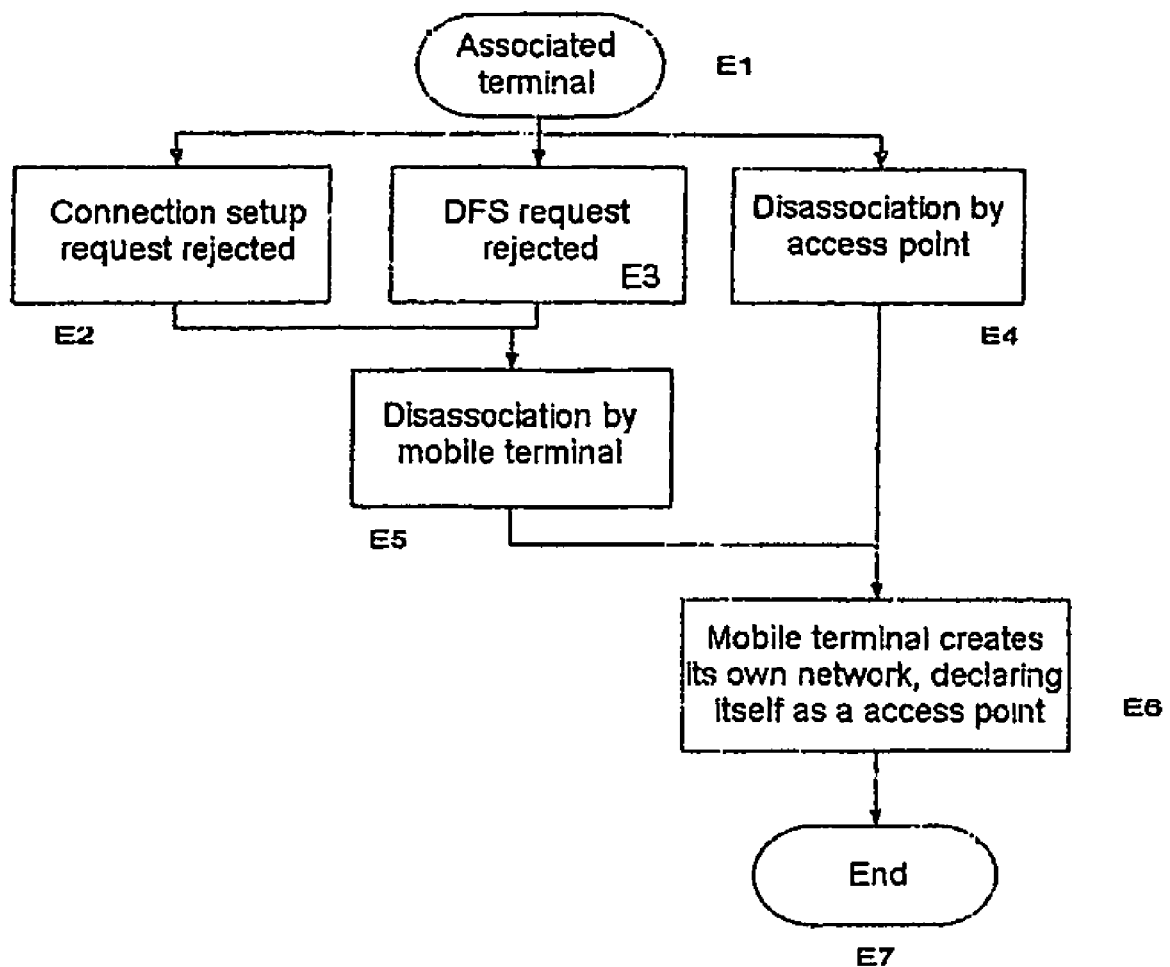
FIG. 4 is a flowchart of the method according to the example embodiment.

FIG. 4 is a flowchart of the method according to the present example embodiment. Following rejection of a request, such as (for example) the establishment of a connection or of a change of frequency, the wireless terminal disassociates itself from the existing network. In the two other cases that were described, the wireless terminal is already disassociated (in the examples mentioned, either following a decision by the access point, or following an association rejection by the access point).

The disassociated wireless terminal then sets itself up as access point of a new network.

Where possible, it will advantageously use a frequency that is different from the initial network with the aim of avoiding any interference. If the new network is created following a frequency change rejection, then the new network will advantageously use a frequency that is different from the frequencies of the initial network and the interfering network. To this end, the mobile terminal can initiate the central controller selection process mentioned in the introduction.

The new access point cannot a priori advertise its new status to the already associated terminals. It is the task of another terminal, once disassociated, to search for the new access point and associate to it.

According to an embodiment, several terminals of the same existing network can decide to disassociate from the existing network to create their own network. These terminals then initiate a selection process to determine which of these terminals will be the access point of the new network. The elements for making the disassociation decision can be communicated between the devices over the existing network. Therefore the new network enables the saturation of some resources of the initial network to be avoided, by operating at another frequency.

The invention claimed is:

1. A method of creation of a new communication network by a plurality of wireless terminals, wherein the wireless terminals are initially part of an existing centralized network that includes an access point able to control the association of wireless terminals to the existing centralized network, said method including, for the wireless terminals, the steps of:
    disassociation of the wireless terminals, initiated by each of said wireless terminals, from the existing centralized network; and
    initiation of a procedure creating a new network, coexisting with the existing network, including a selection of one of the disassociated wireless terminals by the dissociated wireless terminals as an access point of the new network, where the operating parameters of the new network are such that communications on the new network do not interfere with the existing network, the new network using a frequency different from the frequency used by the existing network.

2. The method according to claim 1, wherein the wireless terminal initiates disassociation in at least one of the following cases:
    frequency change rejection by the access point of the existing network following a request for frequency change from the wireless terminal; or
    connection establishment rejection by the access point of the existing network following a request for connection establishment from the wireless terminal.

3. A wireless terminal including an interface with a communication medium, a microprocessor and a memory, wherein the memory of the wireless terminal additionally includes a code to perform a disassociation of the wireless terminal, initiated by said wireless terminal, from an existing network and a code to perform an initiation of a procedure for creating a new network including a selection of a disassociated wireless terminal among a plurality of disassociated wireless terminals as an access point of the new network, where the operating parameters of the new network are such that communications on the new network do not interfere with the existing network, the new network using a frequency different from the frequency used by the existing network.

4. The wireless terminal according to claim 3, wherein the said code is adapted to initiate the disassociation from the existing network in one of the following cases:
    frequency change rejection by the access point of the existing network following a request for frequency change from the wireless terminal; or
    connection establishment rejection by the access point of the existing network following a request for connection establishment from the wireless terminal.

* * * * *